Dec. 24, 1929.  K. CHOGO  1,740,441
APPARATUS FOR MIXING LIQUID AND GAS
Filed Jan. 7, 1928
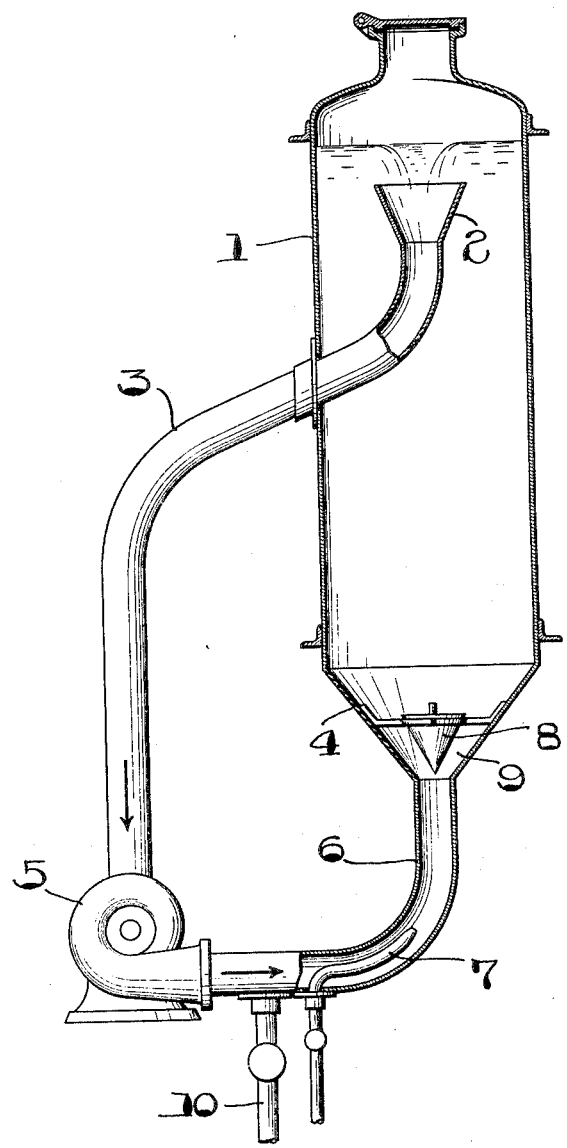
INVENTOR:
Koji Chogo
BY: Ruy, Bayu & Bakelar
ATTORNEYS.

Patented Dec. 24, 1929

1,740,441

UNITED STATES PATENT OFFICE

KOJI CHOGO, OF KOBE, JAPAN, ASSIGNOR OF ONE-HALF TO SHIRO KUBOTA, OF TOKYO, JAPAN

APPARATUS FOR MIXING LIQUID AND GAS

Application filed January 7, 1928, Serial No. 245,066, and in Japan January 28, 1927.

The present invention relates to an apparatus for mixing liquid and gas, having a circulating pipe with a funnel-shaped mouth at the upper part of the interior of a vertical cylindrical tank, in which the said pipe is connected with the bottom of the said tank through a centrifugal pump or high-speed rotary pump and in which a pipe connecting the pump with the tank, namely a delivery passage, is provided with a gas admission nozzle and a baffle plate. The object of the invention is to mix gas with liquid in the form of minute bubbles by drawing out the gas and the liquid together, stirring and mixing them by a pump and then striking the mixture against the baffle plate, accompanied by replenishing gas.

The accompanying drawing shows this invention diagrammatically and is a side view of the same partly in section.

This invention is an improvement in an apparatus for distributing gas uniformly in liquid or giving gas and liquid reaction by bringing them into intimate contact with each other and is for use in the chemical industry. It operates by drawing out from a vertical cylindrical tank both liquid and the gas liberated from the said liquid by means of a centrifugal pump or high-speed rotary pump and stirring up and mixing them together by circulating them by utilizing the rotation of the pump. The apparatus is provided with a replenishing-gas admission nozzle in the delivery passage. The gas and the liquid are struck against the baffle plate and made to gush out from the bottom of the tank through a narrow passage. Thus, by a very simple mechanism the gas is mixed with the liquid in the form of minute bubbles of emulsifying state and their contact surface is enlarged.

The following is an explanation of this invention, reference to be had to the accompanying drawing:—

1 is a vertical cylindrical tank with a conical bottom 4. In the center of the upper part of the tank there is a circulating or intake pipe 3 having a funnel-shaped mouth which forms the bottom of the tank through a centrifugal pump or a high-speed rotary pump 5 and a delivery or outlet pipe 6. The delivery pipe 6 has a replenishing-gas admission nozzle 7 in it. To the bottom 4 of the tank, namely above the mouth of the delivery pipe 6 is fixed a conical baffle plate 8 so as to form a narrow passage 9 between it and the wall of the bottom of the tank. A liquid delivery pipe 10, provided with a suitable valve, is connected to the pipe 6 between the pump 5 and nozzle 7.

In order to utilize the present invention for adding hydrogen to fat, hold the fat at about 180–200° C. by using a heating apparatus or otherwise, mix reduced nickel therewith as catalyzer and rotate the pump 5 while blowing hydrogen to the mixture. Then, the fat is sucked whirling from the upper part of the tank into the funnel-shaped mouth together with hydrogen. After mixed together in the pump, they are struck against the baffled plate 8 together with the hydrogen replenished from the admission nozzle 7 and gush out into the tank from the circular narrow passage 9, so that the hydrogen is mixed therewith and dispersed in the form of minute bubbles of emulsifying state, and as their contact surface is very great, their chemical reaction will be considerably accelerated. Although the apparatus of the present invention has a very simple construction, gas is mixed with liquid in the form of very minute bubbles during the circulation of the liquid. Therefore, it may be utilized very effectively when the chemical reaction or uniform mixture of liquid and gas is desired.

Claims:

1. In a gas and liquid mixer, a mixing tank having a cylindrical body and an inverted frusto-conical lower end, a circulating pump, an outlet pipe leading to the lower end of the tank bottom axially of said tank, an intake pipe having an inverted frusto-conical mouth disposed centrally of the upper part of the tank body and leading through the side of said body to said pump, a valve controlled gas inlet pipe leading into the outlet pipe and terminating in a forwardly directed nozzle axially of said outlet pipe, and an inverted conical baffle located in the inverted frusto-conical tank bottom and axially alined with the outlet pipe.

2. In a gas and liquid mixer, a mixing tank having a cylindrical body and an inverted frusto-conical lower end, a circulating pump, an outlet pipe leading to the lower end of the tank bottom axially of said tank, an intake pipe having an inverted frusto-conical mouth disposed centrally of the upper part of the tank body and leading through the side of said body to said pump, a valve controlled gas inlet pipe leading into the outlet pipe and terminating in a forwardly directed nozzle axially of said outlet pipe, an inverted conical baffle located in the inverted frusto-conical tank bottom and axially alined with the outlet pipe, and a valve controlled liquid supply pipe communicating with the outlet pipe between the pump and gas pipe nozzle.

In testimony whereof I have affixed my signature.

KOJI CHOGO.